(12) United States Patent
Vargantwar (10) Patent No.: US 8,588,870 B1
(45) Date of Patent: Nov. 19, 2013

(54) METHOD AND SYSTEM FOR REDUCING RESOURCE CONSUMPTION TO EXTEND BATTERY LIFE BASED ON AN ESTIMATED TIME TO DESTINATION

(75) Inventor: Sachin R. Vargantwar, Overland Park, KS (US)

(73) Assignee: Sprint Spectrum L.P., Overland, KS (US)

( * ) Notice: Subject to any disclaimer, the term of this patent is extended or adjusted under 35 U.S.C. 154(b) by 464 days.

(21) Appl. No.: 12/905,306

(22) Filed: Oct. 15, 2010

(51) Int. Cl.
*H04M 1/00* (2006.01)

(52) U.S. Cl.
USPC ..... 455/574; 455/450; 455/67.11; 455/127.1; 455/127.5

(58) Field of Classification Search
USPC .......... 455/574, 522, 67.11, 13.4, 572, 115.4, 455/115.1, 573, 115.3, 135, 297, 74.1, 41.2, 455/456.1, 423, 456.2, 414.2, 141.3, 421, 455/456.3, 127.5, 127.1; 370/252; 342/451, 342/357, 458, 450; 320/136, 149, 132, 636; 701/201, 204, 207; 713/340
See application file for complete search history.

(56) References Cited

U.S. PATENT DOCUMENTS

| | | | | |
|---|---|---|---|---|
| 5,959,435 | A * | 9/1999 | Ikegami | 320/132 |
| 6,320,496 | B1 * | 11/2001 | Sokoler et al. | 340/407.1 |
| 6,384,578 | B1 * | 5/2002 | Patino et al. | 320/149 |
| 6,510,210 | B1 | 1/2003 | Baughan | |
| 7,080,405 | B2 | 7/2006 | Himmel et al. | |
| 7,149,504 | B1 * | 12/2006 | Weaver et al. | 455/414.2 |
| 7,243,145 | B1 | 7/2007 | Poortman | |
| 8,228,234 | B2 * | 7/2012 | Paulson et al. | 342/451 |
| 2004/0164712 | A1 * | 8/2004 | Lin et al. | 320/136 |
| 2004/0185918 | A1 | 9/2004 | Fan et al. | |
| 2006/0031368 | A1 | 2/2006 | deCone | |
| 2007/0037526 | A1 * | 2/2007 | Estable | 455/74.1 |
| 2007/0075965 | A1 | 4/2007 | Huppi | |
| 2007/0129044 | A1 | 6/2007 | Chen | |
| 2008/0133956 | A1 * | 6/2008 | Fadell | 713/340 |
| 2008/0161072 | A1 * | 7/2008 | Lide et al. | 455/574 |
| 2009/0125228 | A1 * | 5/2009 | Dicke et al. | 701/201 |
| 2009/0182501 | A1 * | 7/2009 | Fyke et al. | 701/208 |
| 2010/0017506 | A1 | 1/2010 | Fadell | |
| 2010/0026382 | A1 * | 2/2010 | Higaki et al. | 327/544 |
| 2010/0110921 | A1 * | 5/2010 | Famolari et al. | 370/252 |
| 2011/0050503 | A1 * | 3/2011 | Fong et al. | 342/451 |
| 2011/0054780 | A1 * | 3/2011 | Dhanani et al. | 701/204 |
| 2011/0137549 | A1 * | 6/2011 | Gupta et al. | 701/201 |
| 2011/0143805 | A1 * | 6/2011 | Ramasamy et al. | 455/522 |
| 2011/0310753 | A1 * | 12/2011 | Chou et al. | 370/252 |
| 2011/0320607 | A1 * | 12/2011 | Harrang et al. | 709/226 |
| 2012/0052874 | A1 * | 3/2012 | Kumar | 455/456.1 |
| 2012/0098705 | A1 * | 4/2012 | Yost et al. | 342/451 |
| 2012/0202520 | A1 * | 8/2012 | George | 455/456.1 |
| 2012/0202524 | A1 * | 8/2012 | Wachter et al. | 455/456.2 |
| 2012/0220290 | A1 * | 8/2012 | Awad | 455/423 |
| 2012/0315880 | A1 * | 12/2012 | Peitrow et al. | 455/412.1 |

* cited by examiner

*Primary Examiner* — Tan Trinh (57) ABSTRACT

A method and system for reducing resource consumption to extend battery life based on an estimated time to a destination location is provided. A mobile station having mobile station resources, and having a battery that provides power to the mobile station resources for executing applications, is located at a current location and is heading to a destination location. The mobile station allocates a first extent of the resources for execution of at least one application by the mobile station. The mobile station estimates a current travel time from the current location to reach the destination location, and estimates a current remaining power of the battery. Based on the estimated remaining power and the estimated travel time to reach the destination, the mobile station reduces the allocation of resources for execution of the at least one application from the first extent to a second extent.

22 Claims, 6 Drawing Sheets

METHOD AND SYSTEM FOR REDUCING RESOURCE CONSUMPTION TO EXTEND BATTERY LIFE BASED ON AN ESTIMATED TIME TO DESTINATION

BACKGROUND

More people than ever are using mobile stations, such as cell phones and personal digital assistants, to connect to wireless wide area networks (WWANs), each of which (or a plurality taken together) may also be referred to as a radio access network (RAN) and by other names. Service providers typically operate RANs to provide both voice and data services using a wireless communication format (i.e., protocol) such as CDMA (e.g., 1 xRTT, IS-856), EV-DO, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and/or other protocols now known or later developed.

Mobile stations typically include a processor, a transceiver circuit, and an operating system that together provides basic functionality, such as supporting the voice and data services noted above. The processor provides execution cycles for executing machine language program code associated with the operating system, and/or one or more various applications running on the operating system. The transceiver circuit in the mobile station facilitates the voice and data services by providing a wireless interface to a wireless service provider network. A battery contained within the mobile station provides power to the processor and the transceiver circuit. The battery can be charged at home, for example, and provides enough power to operate the processor and transceiver circuit for a limited amount of time. Typical battery life for mobile stations can range from, for example, 3-8 hours.

Various applications may also be available on mobile stations that provide enhanced functionality beyond the simple voice and data services provided by the operating system. These various applications may include mapping programs, e-mail clients, calendars, web browsers, video-streaming clients, games, social-networking tools, weather programs, etc. Each of these various applications may be allocated mobile station resources, perhaps by the operating system, for executing their corresponding functions on the mobile station.

For example, mobile station resources may include a number of execution cycles on the processor, a radio frequency (RF) transmit power of the transceiver circuit for transmitting voice and/or data to the RAN, or a number of times per unit of time that the applications are allowed to contact the RAN with new and/or updated data requests (e.g., a data-synchronization frequency), among other parameters.

The number of execution cycles allocated to an application may increase for a more complex application, and therefore consume more battery power. Because mobile processors are designed for low-power consumption, parts of the processor will normally be powered down when not in use, so that battery power can be preserved. When a particular application requires additional execution cycles, it causes a commensurate increase in battery-power consumption. Applications such as games that require continuous updates to the screen, and processing of user input, tend to consume more execution cycles, and thus battery power, than less demanding applications such as weather programs.

The RF-transmit power allocated to an application (or perhaps to all applications), may increase depending on the number of errors tolerated in wireless communications (a measure of which is called the "frame-error rate"), and may also increase as the mobile station moves farther away from the nearest access point in the RAN and an application requires data communications. The battery power consumed by the transceiver circuit increases correspondingly with the higher RF-transmit power required. Bandwidth-intensive applications such as video-streaming that demand a lower frame-error rate, and thus an increased RF-transmit power, will cause an increase in battery-power consumption compared to less bandwidth-intensive applications that can tolerate a higher frame-error rate, such as e-mail.

The data-synchronization frequency allocated to an application may vary depending on the characteristics of an application. For example, an e-mail client may be configured to have a higher data-synchronization frequency than a weather application, as e-mail inboxes tend to change more often than the weather, and users typically expect near-real-time access to their e-mail. Because more frequent transmissions by the transceiver circuit results in an increase in battery-power consumption, applications such as e-mail that are allocated higher data-synchronization frequencies will consume more battery power.

OVERVIEW

As more applications are executed on the mobile station, more resources need to be allocated to the applications to keep them running, and thus more battery power is consumed. Due to the increase in resource allocation, and thus battery consumption, to keep the applications running, the battery life of mobile stations may decrease more quickly than a user anticipates. For example, a user traveling with their mobile station may need the services of their mobile station most when they arrive at their intended destination. As a result of an unexpectedly higher rate of battery-power consumption, however, the user may experience a situation where the remaining-battery power of their mobile station has already been depleted by the time they arrive at their destination.

One possible solution is to provide mobile-station users with increased control over resource allocation, such as RF-transmit power, data-synchronization frequencies, and processor execution cycles. In view of security and ease-of-use concerns, however, mobile-station manufacturers and RAN operators do not generally grant users any significant amount of control over such mobile-station parameters.

In light of the foregoing, it would be advantageous if a mobile station could more intelligently determine how to allocate mobile-station resources so that applications are allocated sufficient resources to provide a best-possible user-experience, while at the same time, reserving enough mobile-station battery power so that, at the very least, mobile-station voice and data services remain available after a mobile station has reached its intended destination, where the mobile station's services are perhaps needed the most.

Accordingly, disclosed is a method and corresponding apparatus for managing mobile-station resources. The method is directed to a mobile station having mobile-station resources and having a battery that provides power to the mobile-station resources for use in executing an application. As a part of the process, the mobile station determines its current location and a destination location, and allocates a first extent of the mobile-station resources for execution of the application. The mobile station also estimates a travel time for the mobile station to travel from its current location to the destination location, and estimates a remaining power of the battery. Based on the estimated remaining power of the battery and the estimated current travel time for the mobile station to reach the destination, the mobile station reduces the allocation of resources for execution of the application from the first extent to a second extent, so as to reduce a batter power consumption rate and to extend a life of the battery. The second extent may be chosen such that, at a minimum, the mobile station predicts that the battery will last until the destination is reached. Preferably, the allocation of resources is reduced to an extent such that the mobile station predicts that at least 25% of the full-battery-power level will remain upon the mobile station's arrival at the destination.

Mobile-station resources whose allocations are reduced in this process could comprise, among others, a number of execution cycles per unit of time of a processor that are dedicated to execution of the application, an RF-transmit power used in transmitting data to an access point on behalf of the application, and a data-synchronization frequency of data-update requests associated with the application. Other resource parameters could additionally or alternatively be used.

The destination location may be a user-selected destination provided to the mobile station via an input interface of the mobile station. For example, the mobile station may have access to mapping software (e.g., a so-called geographic information system (GIS)) that provides a cartographic interface to the user, and allows the user to select a location by, e.g., street address, latitude/longitude, or some other cartographic designation. The mapping software may be executed locally at the mobile station, or may be accessible to the mobile station via the RAN, perhaps via a packet-switched network coupled to the RAN. Other methods of determining a destination location could also be used.

The mobile station's current location may be obtained from a satellite-assisted global positioning system (GPS) receiver disposed within the mobile station. Perhaps in response to a query from the mapping software executing locally at the mobile station, or in response to a query received from the RAN, the GPS receiver may utilize signals received from satellites orbiting the earth, and a mathematical process such as trilateration, to determine its current location. Alternatively or additionally, the mobile station's current location may be obtained by the mobile station via a triangulation calculation, which uses known locations of three or more wireless access points, and the received strengths of the signals from those access points, to determine its location. In another aspect, the mobile station or RAN may adopt a location of a nearest wireless access point with which the mobile terminal maintains an active voice or data connection as a general estimate of the mobile station's location. Other methods of determining the mobile station's current location could also be used.

The estimated travel time from the mobile phone's current location to the destination location may be established in a number of ways, and by a number of entities. For example, this estimate may be provided by the mapping software executing on the mobile station, or by a network device executing mapping software and accessible to the mobile station via the RAN. The mapping software may use knowledge regarding average or posted speed limits along the route from the current location to the destination location to determine an estimated travel time. Alternatively or additionally, assuming a distance between the current location and the destination location is known, an average speed for a predetermined previous period of time may be used and extrapolated to determine an estimated travel time to travel from the current location to the destination location. Of course, other methods of determining an estimated travel time could also be used.

The mobile station may predict battery life in a number of ways. For example, the mobile station may extrapolate historical battery-power usage, and based on the estimated travel time, estimate a battery-power level that will be remaining upon arrival at the destination location. The historical battery-power usage may be limited to a predetermined period of time (e.g., one hour), a period of time that is measured since the last full battery charge, or perhaps a period of time based on an average-battery-power usage measured over days, weeks, or months. If, based on the extrapolated-battery-power usage, the mobile station estimates that the battery will not last until the destination location is reached, the mobile station may proceed to reduce application resource consumption so as to increase an expected battery life.

In one aspect, the mobile station may compare an estimated-battery level upon arrival at the destination to a minimum-threshold level set by the mobile station or RAN, and may proceed to further reduce resource allocation to the application so as to help ensure that at least the minimum-threshold level of battery power remains upon arrival at the destination location. By enforcing a minimum-threshold level, the mobile station may help to ensure that critical functions such as voice services and data services remain available to users upon arrival at the destination location. The minimum-threshold level may be, for example, in the range of 1-25% of a full-battery-power level. Other threshold levels could also be used.

In accordance with the foregoing, a mobile station provided with a current and destination location may automatically, and advantageously, reduce corresponding resource allocations to one or more applications executing on the mobile station, so as to help ensure that a minimum level of battery power remains upon arrival at the destination location. As a result, it is less likely that a mobile-station user will experience a situation in which the voice and data services the mobile station normally provides become unavailable upon arrival due to a lack of remaining-battery power.

These as well as other features, advantages and alternatives will become apparent to those of ordinary skill in the art by reading the following detailed description, with appropriate reference to the accompanying drawings.

BRIEF DESCRIPTION OF FIGURES

Exemplary embodiments of the present invention are described with reference to the drawings, in which.

DETAILED DESCRIPTION

In the following detailed description, reference is made to the accompanying drawings, which form a part hereof. In the figures, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

a. Overview of an Example Network Architecture

Figure 1:
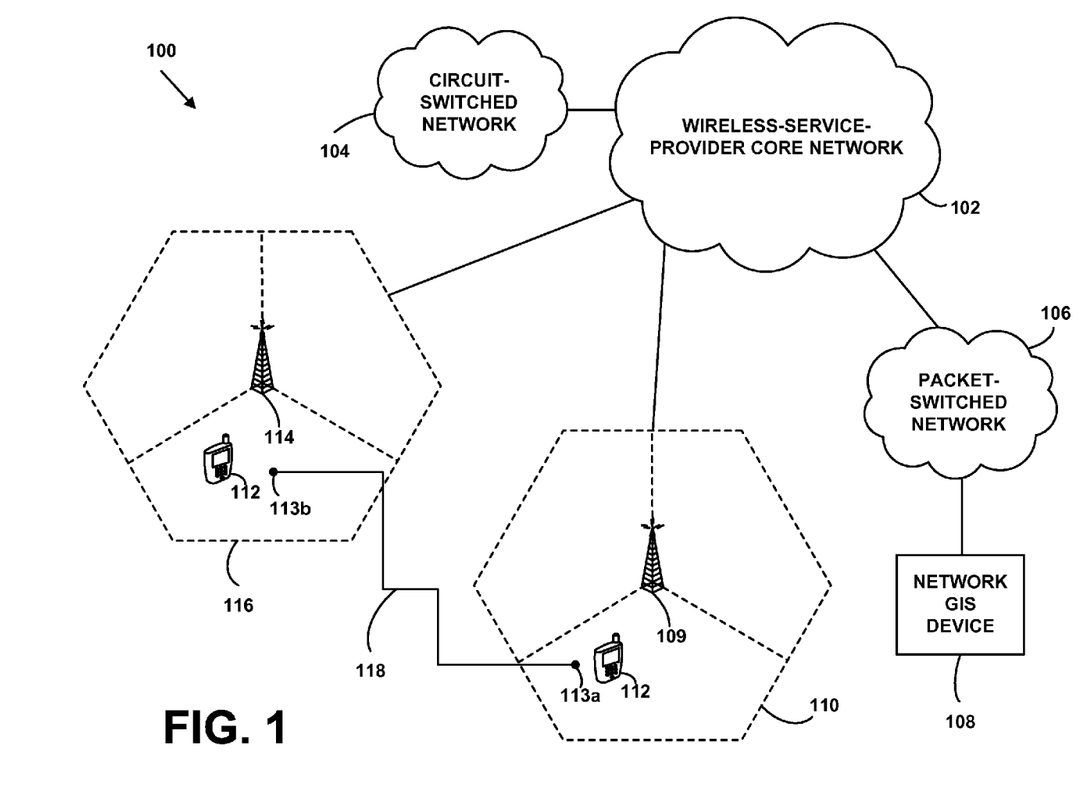
FIG. 1 is a block diagram illustrating one embodiment of a wireless communication network in which a mobile station may operate.

Referring to the drawings, FIG. 1 is a simplified block diagram of a communication system 100 in which at least one embodiment can be implemented. As shown, the system 100 includes a wireless-service-provider core network 102, a circuit-switched network 104 (e.g., the public switched telephone network (PSTN)), a packet-switched network 106 (e.g., the Internet), a network geographic information server (GIS) device 108 accessible via network 106, a base transceiver station (BTS) 109, a coverage area 110 associated with BTS 109, a mobile station 112, a BTS 114, a coverage area 116 associated with BTS 114, and a travel path 118 that mobile station 112 travels between a current location 113a in coverage area 110 and a destination location 113b in coverage area 116.

The mobile station 112 may be any wireless communications device, such as a cell phone, personal digital assistant (PDA), or other wirelessly-equipped device, the provides voice and/or data services to a user. The wireless-service-provider core network 102 functions to support these voice and/or data services by providing connectivity between the mobile station 112 and one or more transport networks, such as the circuit-switched network 104 and the packet-switched network 106.

The BTSs 109, 114 may each be any entity that facilitates communication between a mobile station 112 and the wireless-service-provider core network 102. Although FIG. 1 depicts the communication system 100 as including only two BTSs, it should be understood that the communication system 100 may include more than two BTSs. Each BTS 109, 114 may have a transmitter that radiates RF energy at one or more carrier frequencies that, based on a direction of the transmitter and the topography of the surrounding area, create corresponding RF-radiation patterns that define coverage areas. The RF-radiation may provide one or more air interfaces over which a mobile station 112 may communicate with the wireless-service-provider core network 102. For example, the BTS 109 may radiate omni-directional RF energy patterns that provide a single air interface. Alternatively, the BTS 109 may radiate directional RF energy patterns that provide multiple air interfaces. For example, as shown in FIG. 1, BTS 109 transmits RF-radiation in three directions to form a coverage area 110 comprised of first, second, and third coverage area sectors. The BTS 109 may provide one or more air interfaces in each of these sectors.

Each of the one or more air interfaces of a given BTS 109, in a given sector, may define a corresponding wireless coverage area. For example, if the first BTS 109 provides a single omni-directional air interface, then the BTS 109 may serve a single wireless coverage area (e.g., a cell). Alternatively, if the BTS 109 provides two air interfaces in each of the sectors shown in FIG. 1, the BTS 109 may serve six wireless coverage areas.

The air interfaces of the BTS 109 may carry communications between the wireless-service-provider core network 102 and a mobile station 112 according to any of a variety of protocols. For example, the air interfaces may carry communications according to any of the protocols noted above, and/or other protocols now known or later developed. Depending on the protocol employed, the air interfaces may also be divided into a plurality of channels for carrying different types of communications between the wireless-service-provider core network 102 and a mobile station 112. For example, each air interface may include forward-link channels (e.g., paging channels, forward-traffic channels, etc.) for carrying forward-link communications from the wireless-service-provider core network 102 to a mobile station 112, as well as reverse-link channels (e.g., access channels, reverse-traffic channels, etc.) for carrying reverse-link communications from a mobile station 112 to the wireless-service-provider core network 102.

The wireless-service-provider core network 102 may include a number of other components, not shown in FIG. 1, to carry out various functions. For example, the network 102 may include a radio network controller (RNC), which may function to communicate with BTSs 109, 114 and control aspects of the BTSs 109, 114 (and perhaps other BTSs in the communication system 100) as well as aspects of the air-interface communication with the mobile station 112. The RNC may also control assignment of air-interface traffic channels to the mobile station 112, and may control aspects of a mobile station's 112 switching between sectors and/or cells in the communication system 100. Further, the RNC may facilitate communication between BTSs, such as communication between the first BTS 109 and the second BTS 114.

As another example, the wireless-service-provider core network 102 may include a switch, such as a mobile switching center (MSC), which may provide connectivity with the circuit-switched network 104. Further, the wireless-service-provider core network 102 may couple to another switch, such as a packet data serving node (PDSN), which may provide connectivity with the packet-switched network 106. In this respect, the wireless-service-provider core network 102 may additionally include a packet control function (PCF) for controlling packet-data communications.

Accordingly, with this general arrangement, the wireless-service-provider core network 102 may facilitate communications between two mobile stations in the wireless-service-provider core network 102, as well as communications between a given mobile station 112 in wireless-service-provider core network 102 and a communication device on the circuit-switched network 104 and/or the packet-switched network 106.

In practice, for instance, mobile station 112 may engage in communications with network GIS device 108 via wireless-service-provider core network 102 and packet-switched network 106. The network GIS device 108 may maintain one or more applications, databases, or other resources accessible by one or more applications running on the mobile station 112. For example, a mapping application running on mobile station 112 may periodically access cartographic information on network GIS device 108 in order to determine a best route, or a time to destination, from a current location 113a to a destination location 113b. Of course, mobile station 112 may access one or more other network-connected devices to support any number of the other applications noted above.

The mobile station 112 may request and receive service from the wireless-service-provider core network 102 in a single "serving" coverage area (and thus from a single serving BTS on a particular air interface), which mobile station 112 may select from the service provider's plurality of coverage areas. To facilitate this selection process, mobile station 112 may monitor signal conditions (e.g., carrier-to-interference (C/I) ratio and/or a signal-to-interference-plus-noise ratio (SINR)) for a plurality of coverage areas detected by the mobile station 112. The mobile station 112 will then typically request and receive service in the coverage area with the best signal conditions (i.e., the "strongest" coverage area).

b. Example Mobile-Station Device Structure

Figure 2:
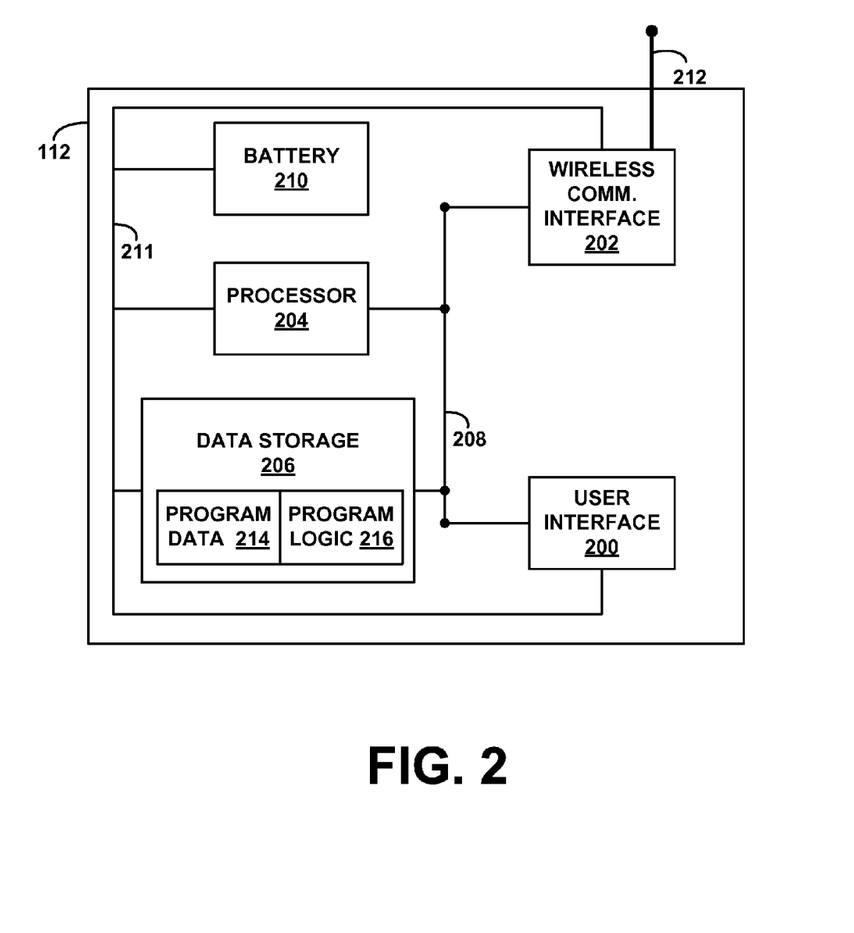
FIG. 2 is a block diagram illustrating an example structure of a mobile station according to one embodiment.

FIG. 2 is a simplified block diagram showing functional components of a mobile station 112 capable of carrying out the mobile station functions described herein. As shown in FIG. 2, mobile station 112 may include a user interface 200, a wireless communication interface 202, a processor 204, and data storage 206, all linked together via a system bus, network, or other connection mechanism 208. The mobile station 112 further includes a battery power source 210 and a power distribution line or circuit 211 connecting the battery to the powered components 200-206.

The user interface 200 preferably functions to facilitate user interaction with the mobile station 112. As such, the user interface 200 may include a variety of input components, such as a touch screen, a navigation pad, a multi-functional button, a thumb wheel, a keyboard or keypad, and/or a microphone. Additionally, the user interface 200 may include a variety of output components, such as a display screen and/or a speaker. The user interface 200 may also include signal-processing components, such as an analog-to-digital (A-D) and digital-to-analog (D-A) circuitry and other components for facilitating user interaction with the mobile station 112.

The communication interface 202 may provide for air-interface communication so as to communicatively and bi-directionally couple the mobile station 112 to a serving BTS, and thus to the wireless-service-provider core network 102. The communication interface 202 may include a chipset comprising a transmitter circuit and a receiver circuit adapted to facilitate wireless communication according to a desired wireless protocol. The communication interface 202 may include multiple communication interfaces, such as one with which the mobile station 112 sends reverse-link communications and one with which the mobile station 112 receives forward-link communications. Other configurations are also possible. An internal or external antenna 212 may further be coupled to communication interface 202 to facilitate wireless communications.

The transmitter circuit in the wireless communication interface 202 may contain one or more circuit components including channel coders, demultiplexers, multiplexers, digital-to-analog converters, low-pass filters, band-pass filters, and power amplifiers. The amount of power consumed by the transmitter circuit (and thus the communication interface 202) is related to the transmitted energy and the energy consumed by the circuit components of the transmitter and receiver circuits.

The underlying wireless protocol used by the transmitter circuit may be based on any air interface protocol, examples of which include time-division multiplexing (TDMA), code-division multiplexing (CDMA), and frequency division multiplexing (FDMA). With any one of these protocols, the transmitter circuit may be placed in a low-power state when there is nothing (e.g., no data traffic, control traffic, etc.) for the transmitter circuit to transmit to a serving BTS. How often the transmitter must exit the low-power state is related to the frequency of transmissions generated by an application running on the mobile station 112 (e.g., the application's data-synchronization frequency). The more often the transmitter circuit must exit the low-power state (e.g., the higher the data-synchronization frequency), the higher the power consumption of the transmitter circuit. Thus, one parameter in determining a power consumption of the transmitter circuit is the data-synchronization frequency of one or more applications running on the mobile station 112.

Once a transmission is generated by an application for transmission to a serving BTS, the transmitter circuit must determine what RF-transmit power to use in communicating with the serving BTS. The higher the RF-transmit power used, the higher the power consumption of the transmitter circuit. Thus, a second parameter in determining a power consumption of the transmitter circuit is the RF-transmit power used to transmit to the serving BTS. Accordingly, the transmitter resources that may be allocated include transmission frequency and RF-transmit power.

The RF-transmit power used by the transmitter circuit may be related to a frame-error rate requested by an application. Because a higher RF-transmit power must be used to maintain a lower requested frame-error rate, lower requested frame-error rates will cause a commensurate increase in RF-transmit power and thus power consumption of the transmitter circuit. Frame-error rates will generally fall within the range of 1-5%, and RF-transmit power in the range of 0.1-3 Watts.

Data-synchronization frequency may be measured by absolute time (e.g., number of transmissions per pre-determined period of time), by a percentage (e.g., 1%) of available transmission time, by a number of actual transmission slots used (e.g., 1) out of a number of transmission slots available (e.g., 100), or some other unit of measurement. Independent of the unit of measure, the higher the data-synchronization frequency allocated to a particular application, the more power will be consumed by the transmitter circuit.

Battery 210 provides operational power to the user interface 200, wireless communication interface 202, processor 204, and data storage 206, via power distribution line 211. The battery 210 may be, for example, a rechargeable battery comprised of one or more electrochemical cells. More specifically, the battery 210 may be an electrochemical cell comprising a particular combination of chemicals, such as a lead-acid battery, a nickel cadmium (NiCd) battery, a nickel metal hydride (NiMH) battery, a lithium ion (Li-ion) battery, and a lithium ion polymer (Li-ion polymer) battery, among others. Other energy storage devices could also be used, such as super capacitors. A charging circuit included within the mobile station 112 may function to re-charge the battery 210 when the mobile station 112 is coupled to an alternating current (AC) or direct current (DC) main. When not connected to an AC or DC main, the battery 210 will begin to discharge relative to an amount of power consumed by the elements that are drawing power from it, including the above-mentioned user interface 200, wireless communication interface 202, processor 204, and data storage 206, for instance.

Processor 204 may comprise one or more general purpose microprocessors and/or dedicated signal processors. (The term "processor" encompasses either a single processor or multiple processors that could work in combination.). Processors may be asynchronous (e.g., independent of a clock) or synchronous (e.g., dependent upon a clock) devices. Processor resources may be allocated in any number of ways including, for example, a number of dispatched instructions allocated (perhaps per unit time), a number of allocated application threads (perhaps per unit time), a number of allocated execution cycles (perhaps per unit time), a number of allocated processor cores, etc.

Taking a synchronous processor as one example, processor 204 may operate off of a square-pulsed system clock. Each period from one rising edge of the clock to a next rising edge of the clock may be considered an execution cycle of the processor 204. For a processor running off of a 3 gigahertz (GHz) clock, for example, the processor runs through $3 \times 10^9$ execution cycles per second. Other types of execution cycles are possible as well.

As noted earlier, the battery 210 provides operational power for the processor 204. When the processor 204 has no work to do during a particular period of time (e.g., processor 204 resources have not been allocated to an application), the processor 204 may shut down all, or selected portions, of the processor 204 in order to reduce power consumption. In contrast, whenever processor resources are allocated to an application, respective circuit portions of the processor 204 necessary to process application instructions may not be powered down. The battery 210 power consumed by the processor 204 while the mobile station 112 is operating can thus be reduced by reducing the number of execution cycles allocated to applications for a particular period (or periods) of time.

Data storage 206 may comprise memory and/or other storage components, such as optical, magnetic, organic, or other memory or disk storage, which can be volatile and/or non-volatile, internal and/or external, and integrated in whole or in part with the processor 204. Data storage 206 may contain or may be arranged to contain (i) program data 214 and (ii) program logic 216. Although these components are described herein as separate data storage elements, the elements could just as well be physically integrated together or distributed in various other ways. In one example, the program data 214 could be maintained in data storage 206 separate from the program logic 216.

Program data 214 may contain a number of data elements to support resource-allocation logic executing at the mobile station 112. For example, program data 214 may contain a battery-power-threshold value, a default resource-allocation list, geographic information server (GIS) databases, and historical battery-power-level data points.

The battery-power-threshold value may be a value indicative of a minimum-threshold level of battery 210 power that should remain upon arrival at a destination location 113b. The battery-power-threshold value may be a value hard coded in the mobile station 112 such as, for example, in a read-only-memory (ROM) during manufacture, and thus not updateable. Alternatively or additionally, the value may be stored (permanently or temporarily) in a writable storage medium and may be updateable by a user (perhaps via an input interface on the mobile station), updateable by the wireless-service-provider core network 102 (perhaps via the wireless communication interface 202), or updateable by some other network entity.

In at least one embodiment, the battery-power-threshold value may be in the range of 1-25% of a full-battery-power level, meaning that the mobile station 112 attempts to allocate resources to applications in a manner so as help ensure that 1-25% battery 210 power, relative to the full-battery-power level, remains upon arrival at the destination location 113b.

The threshold value could, alternatively, be stored in a data store separate from the program data 214 and program logic 216.

The default resource-allocation list may, for each application set forth in the list, provide a default (or initial) set of one or more resource allocations that the respective application will use in requesting an initial resource allocation from the resource-allocation logic executing at the mobile station 112. For example, the default resource-allocation list may set forth that a particular application will request, upon execution, a particular data-synchronization frequency, a particular number of processor-execution cycles per unit of time, and a particular frame-error rate. Other types and combinations of resource-allocation requests are possible as well.

The GIS databases may be made accessible to a GIS application so as to provide routing information to the GIS application. The recorded historical battery-power-level data points may be used by the resource-allocation logic in predicting future battery-usage rates. Historical battery-power-level data points may be recorded at regular or irregular intervals, and may be tracked for a pre-determined amount of time, since the last power-in, since manufacture, or based on some other designated time-period.

Program logic 216 preferably comprises machine-language instructions that may be executed and/or interpreted by processor 204 to carry out various functions described herein. As such, the instructions may define resource-allocation logic, application programs, operating-system functions, and a GIS application.

The resource-allocation logic may determine how mobile-station resources should be allocated to applications. In particular, the resource-allocation logic may function to allocate mobile-station resources to requesting applications, taking into account a number of factors, including at least a remaining-battery-power level and a travel time to reach the destination location 113b. The resource-allocation logic may further function to monitor a current-power level of the battery 210 relative to a full-battery-power level. The mobile station 112 may cause a corresponding display indicative of the relative amount of battery power remaining to be provided to a user via the user interface 200.

The application programs may include e-mail clients, calendars, web browsers, video-streaming clients, mapping (e.g., GIS) programs, games, social-networking tools, and weather programs. Each of these application programs may have an associated default data-synchronization frequency, processor-execution cycles per unit of time, and/or frame-error rate, and may make corresponding resource-allocation requests upon execution. The default parameters may be stored within the respective applications themselves (and thus within the program logic 216), or may be obtained from the associated resource-allocation list stored in program data 214.

The operating-system may provide basic mobile-station functions such as voice and data calling, and may act as a platform for the execution of additional applications that provide new functionality above and beyond that provided by the operating system. The operating system may act as a platform by providing basic interfaces for the application programs to access basic mobile-station functions and resources. For example, the operating system platform may provide a file-system interface to allow application programs to manipulate files stored in program data 214, and may provide a communications interface to allow application programs to transmit and receive data, all without requiring the application program author to duplicate the file-system and communications programming necessary to execute these basic functions. Other interfaces may also be provided.

The GIS application may provide mapping and/or location services to a user, and may have access to the local traffic, route, and mapping databases in program data 214. The GIS application may provide a program interface via the user interface 200. A user may manually enter in a destination location 113b to the GIS application via the user interface 200, or may provide the GIS application with a destination location 113b via another application (such as an address book, calendar, or web-browser application).

It should be understood that user interface 200, wireless communication interface 202, processor 204, data storage 206, battery 210, program data 214 and its associated data, and program logic 216 and its associated functions, are described herein by way of example only. Those skilled in the art will thus appreciate that other program logic and/or functions may be used instead, some program logic and/or functions may be added, and some program logic and/or functions may be omitted altogether. Further, the various functions described herein can be embodied in software, hardware, and/or firmware, or any combination thereof. When embodied in software, the software may be stored on any computer-readable medium for use by, or in connection with, any computer-related system or method. In the context of this document, a computer-readable medium is an electronic, magnetic, optical, or other physical device or means that can contain or store a computer program for use by, or in connection with, a computer related system or method. The methods can be embodied in any computer-readable medium for use by or in connection with an instruction execution system, apparatus, or device, such as a computer-based system, processor-containing system, or other system that can fetch the instructions from the instruction execution system, apparatus, or device and execute the instructions, such as an mobile station and/or wireless communication device.

c. Example Operation

Figure 3:
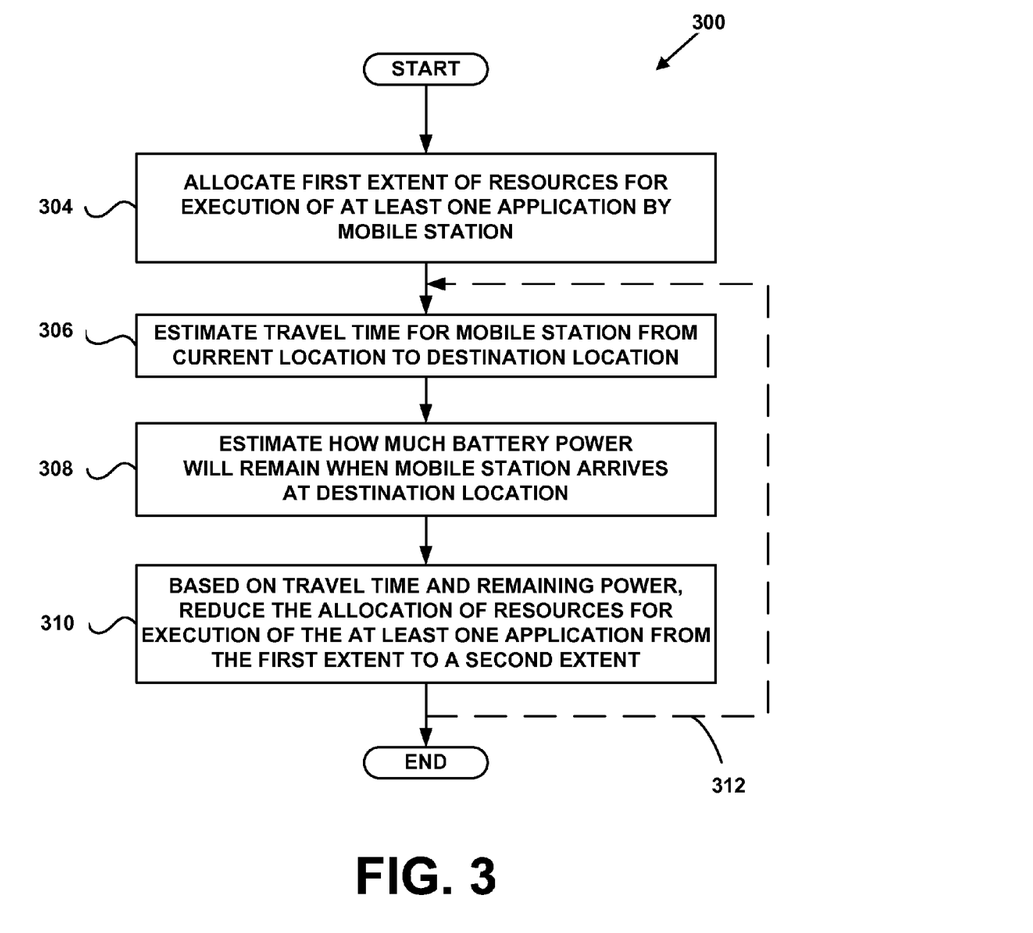
FIG. 3 is a flowchart depicting functional blocks of a method for reducing resource consumption to extend battery life based on an estimated time to the destination location according to one embodiment.

FIG. 3 is a flowchart depicting functional blocks of an example method 300 for reducing resource consumption and extending battery life based on an estimated time to the destination location 113b. As shown in FIG. 3, method 300 begins at step 304, when the resource-allocation logic at mobile station 112 allocates a first extent of resources for execution of at least one application. At step 306, the resource-allocation logic estimates a travel time for the mobile station to travel from its current location 113a to the destination location 113b. At step 308, the resource-allocation logic estimates how much battery power will be remaining when the mobile station 112 arrives at the destination location 113b. Finally, at step 310, the resource-allocation logic reduces the allocation of resources for execution of the at least one application from the first extent to a second extent so as to raise an estimated remaining-battery-power level upon arrival at the destination location 113b. These steps are further described below.

i. Allocating First Extent of Resources

At step 304, the resource-allocation logic allocates a first extent of resources for execution of at least one application. This process may include, upon start-up of an allocation, the application generating a resource-allocation request and providing it to the resource-allocation logic, the resource-allocation logic considering the currently available mobile-station resources, and the resource-allocation logic granting or denying the request.

For example, the application may be an e-mail application, which upon start-up may request an initial allocation of mobile-station resources, including processor resources and wireless communication interface resources. The e-mail application's request for wireless communication interface resources may be based on the e-mail application's need to transmit requests for new e-mail data to a remote e-mail server on a periodic basis, perhaps via packet-switched network 106.

Requested processor resources may include a number of execution cycles per unit of time of processor 204 that may be dedicated to execution of the e-mail application. Requested wireless communication interface resources may comprise a frame-error rate (which may determine an RF-transmit power used in transmitting data to an access point on behalf of the e-mail application), and a data-synchronization frequency (measured in units of transmissions allowed per unit time) of data-update requests associated with the e-mail application.

For example, the e-mail application may request an initial allocation of processor-execution cycles of $3 \times 10^7$ execution cycles per second, approximately 1% of the available execution cycles on a 3 GHz processor. The e-mail application may provide the request to the resource-allocation logic via an application programming interface (API), or some other inter-process messaging mechanism.

Assuming sufficient resources are available, the resource-allocation logic may grant the request and allocate the requested processor-execution cycles to the e-mail application. Of course, the number of execution cycles requested by any particular application, and the number actually allocated, may vary. Furthermore, the resources requested and/or granted may increase for a more complex application, such as a game.

In a further example, the e-mail application may request an initial frame-error rate of 1% that, based on current signal conditions detected at the mobile station 112, may cause the resource-allocation logic to allocate 0.85 Watts of transmit power for data traffic generated by the e-mail application, in order to maintain the frame-error rate at approximately the requested rate of 1%. Of course, the transmit power allocated may change based on detected signal conditions between the mobile station 112 and a serving BTS such as BTS 109. The e-mail application may also request an initial data-synchronization frequency of 4 minutes (e.g., one data-synchronization request made every 4 minutes), and based on a current utilization level of the transmitter circuit, the resource-allocation logic may grant the request.

Of course, the resource-allocation logic may, in some embodiments, decide not to grant any of the resources requested by the application, or may decide to grant only a portion of the resources requested. For purposes of example in this disclosure, however, it is assumed that the initial requests are granted, and corresponding resources allocated to the requesting e-mail application.

ii. Estimating Travel Time for Mobile Station to Reach Destination

At step 306, the resource-allocation logic obtains an estimate of a travel time for the mobile station 112 to travel from its current location 113a to the destination location 113b. In order to estimate the travel time, the resource-allocation logic must obtain the current location 113a and the destination location 113b, and then estimate the travel time between them.

The mobile station 112 may determine its current location 113a, and the destination location 113b, in a number of different ways, using either locally-available location-determination functions and/or remotely-available location-determination functions. More specifically, mobile station 112 may access a local location-determination function, a remote location-determination function via the wireless-service-provider core network 102, or a combination of both.

Local location-determination functions may include the mobile station 112 using a terrestrial positioning system, a celestial positioning system, or a combination of these systems to determine its position. Terrestrial positioning systems utilize various techniques, such as triangulation, which uses known locations of three or more wireless access points (e.g., BTSs 109, 114, etc.), and the received strengths of the signals from those access points (detected via wireless communication interface 202), to determine its current location 113a.

The Global Positioning System (GPS) is an example of a celestial positioning system. The mobile station 112 may include a GPS receiver circuit that utilizes signals received from satellites orbiting the earth, and a mathematical process such as trilateration, to determine its current location 113a. From the mathematical process, mobile station 112 can determines its latitude and longitude. The GPS receiver circuit and software may then forward this information to the mobile station's 112 operating system.

The remotely-available location determination functions may involve an active passive or passive location-determination process. In a passive process, mobile station 112 may simply wait for location information to be transmitted to it by the network 102. In an active process, mobile station 112 may send a location-determination request to the wireless-service-provider core network 102 and wait for a response.

The passive process may involve access points, such as BTSs 109 and 114, periodically transmitting their location information (e.g., without receiving a request from any mobile station to do so). In this manner, mobile station 112 may use the received location information from BTSs 109, 114, etc. to determine its current location without having to generate additional network traffic via one or more location-determination requests.

In contrast, the active process requires mobile station 112 to generate network traffic. For example, mobile station 112 may send a location-determination request to the wireless-service-provider core network 102. The network 102 may respond to the request in a number of ways, including sending the location of a nearest serving BTS and triangulating the mobile station's location.

The network 102 may maintain a list of the known locations of access points (e.g., BTSs 109 and 114 in FIG. 1). One active-process network response to a location-determination request may be to determine the BTS 109 with the strongest (or only) connection with mobile station 112, and to transmit the known location of the BTS 109 as location information in a responsive communication to the mobile station 112.

Of course, more complex active-process methodologies could also be used by the network 102. For example, the wireless-service-provider core network 102 may use signal strengths detected at a plurality of BTSs 109, 114, etc. in order to more accurately estimate a location of the mobile station 112, using, for example, a triangulation process, and may thereafter transmit the corresponding location information to the mobile station 112. Other methods of determining the mobile station's 112 current location 113a could also be used.

In addition to determining its current location 113a, mobile station 112 must also determine the destination location 113b. In determining the destination location 113b, mobile station 112 may use a local destination-determination function, may use a remote location-determination function via the wireless-service-provider core network 102, or may use a combination of both. A local destination-location-determination function may be provided by, for example, the GIS application in program logic 216. In this case, a user may be able to search for a desired destination via user interface 200, which provides the interface to the GIS application. In one example, a user enters a search term into the GIS application, via user interface 200, comprising "United States Patent and Trademark Office," and in response, is directed to the United States Patent and Trademark Office in Alexandria, Va. The destination-location information generated in response to the search may include a street address ("600 Dulany Street, Alexandria, Va. 22314"), cartographic coordinates ("Latitude 38.801694°, Longitude −77.064043°"), or some other location-identification information.

Destination search terms and/or destination-location information could also be culled from other applications running on the mobile station 112, such as an address book, a calendar, an e-mail, a web-page, or other source. For example, a user may access an address-book application, choose a particular contact, and load destination-location information associated with the contact into the GIS application. In at least one example, a calendar application may keep track of future appointments and automatically provide a destination location associated with a future appointment to the GIS application. In one example, the application may already have destination-location information associated with the destination available (for example, a street address, cartographic coordinates, or some other location-identification information). In another example, the destination stored in the application may be loaded as a search term into the GIS application, and destination-location information returned by the GIS application in response to the search.

Mobile station 112 may additionally, or alternatively, access a network GIS device 108 to obtain destination-location information. Network GIS device 108 may provide similar services to those described above relative to a local GIS application executing at mobile station 112, however, due to the limited processing and storage capabilities available at mobile station 112, the network GIS device 108 may be able to provide a larger and more current database of destinations, and to conduct searches quicker, than the mobile station 112 could. Similar to the above, mobile station 112 may receive destination search terms via user interface 200. These destination search terms may then be transmitted to network GIS device 108 by transmitting corresponding data packets to BTS 109 that are addressed to the network GIS device 108. BTS 109 then forwards the data packets to network GIS device 108 via the wireless-service-provider core network 102 and packet-switched network 106. Destination-location information transmitted by the network GIS device 108 to mobile station 112 in response may similarly include a street address ("600 Dulany Street, Alexandria, Va. 22314"), cartographic coordinates ("Latitude 38.801694°, Longitude −77.064043°"), or some other location-identification information.

Once mobile station 112 has determined its current location 113a and the destination location 113b, the resource-allocation logic obtains an estimate of the travel time for the mobile station 112 to travel from the current location 113a to the destination location 113b. The travel time may be estimated in a number of different ways, and by a number of different entities. In a similar manner to the destination-location determination, an estimated travel time may be estimated via a process executed locally at the mobile station 112, or may be estimated with assistance from the network GIS device 108.

For example, the GIS application executing at mobile station 112 may provide an estimated travel time after receiving (or determining) the current and destination locations. The estimated travel time could be a time that the GIS application determines by reference to the GIS databases stored in program data 214. The travel time could be based on one or more modes of transportation, such as a drive time in a motor vehicle (via streets open to vehicular traffic), a walk time (via routes open to pedestrian traffic), or a public transportation time (via one or more train, bus, or plane routes). The GIS application may be provided information regarding the desired mode of transportation by a user, or may automatically detect it, perhaps based on a detected location of the mobile station 112 relative to a type of route, and/or based on a detected velocity of the mobile station 112. The GIS application may then return the estimated travel time to the resource-allocation logic. Other methods of locally calculating an estimated travel time could also be used.

Mobile station 112 may additionally or alternatively access the remote GIS device 108 to determine an estimated travel time from the current location 113a to the destination location 113b. For example, mobile station 112 may transmit a travel time request to network GIS device 108 that includes the current location 113a and the destination location 113b, and in response, receive an estimated travel time. The remote GIS device 108 may operate in a similar fashion to the local GIS application once it has received the current location 113a and the destination location 113b.

Figure 4:
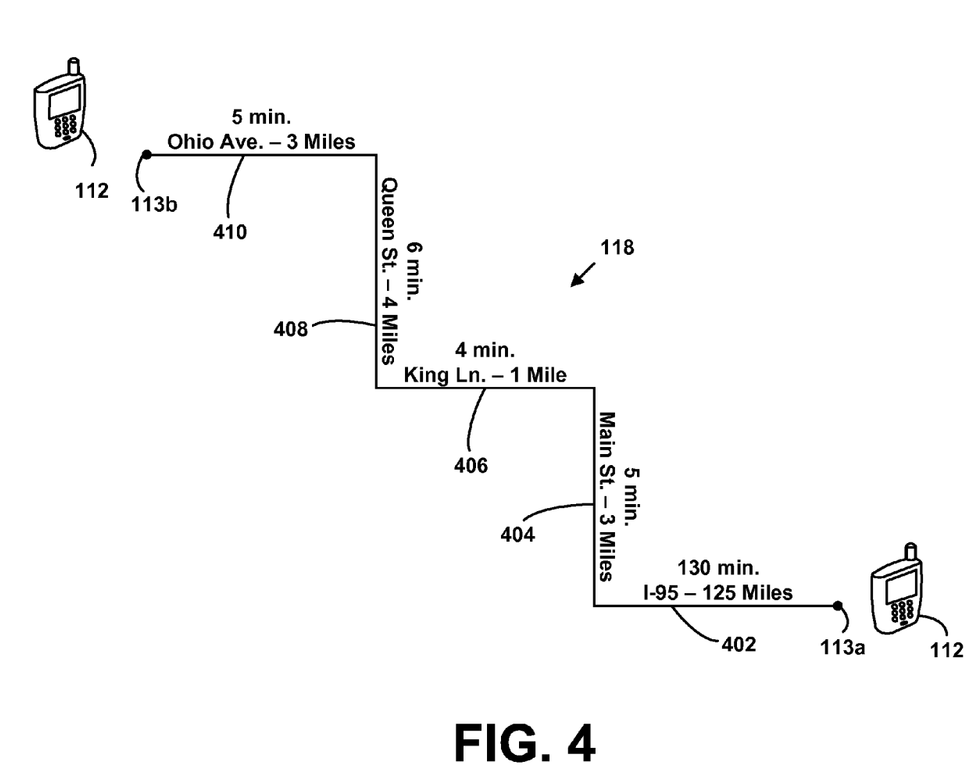
FIG. 4 is a cartographic diagram illustrating an example calculated distance between a current location and destination location.

FIG. 4 is a cartographic diagram illustrating one example of how a GIS application, executing at mobile station 112 or network GIS device 108, may determine an estimated travel time based on a calculated route between the current location 113a and the destination location 113b. For example, taking into consideration roadway speed limits and/or traffic conditions, the GIS application may determine that a best route 118 (fastest, shortest, etc.) between current location 113a and destination location 113b comprises I-95 402, Main St. 404, King Ln. 406, Queen St. 408, and Ohio Ave. 410. Additionally, the GIS application may calculate an estimated travel time for each link in the route by accessing the route and traffic databases. For example, the GIS application may determine that traversing I-95 402 will take 130 minutes, Main St. 404 5 minutes, King Ln. 406 4 minutes, Queen St. 408 6 minutes, and Ohio Ave. 410 5 minutes. The total estimated travel time for the route 118 is thus, in this example, 150 minutes.

iii. Estimating how Much Battery Power Will Remain when the Mobile Station Arrives at the Destination Location Once the estimated travel time to reach the destination location 113b has been determined, and at step 308, the resource-allocation logic estimates what the mobile station's remaining-battery-power level will be when the mobile station 112 arrives at the destination location 113b. To estimate the level, the resource-allocation logic at the mobile station 112 may calculate a historical battery-power usage rate, estimate the expected battery-power usage rate between the current location 113a and the destination location 113b based on the historical rate, estimate an in-transit power consumption based on the expected battery-power usage rate and the estimated travel time (from step iii), and determine how much battery power will remain when the mobile station arrives at the destination location based on the in-transit power consumption and the current remaining-battery-power level.

Figure 5:
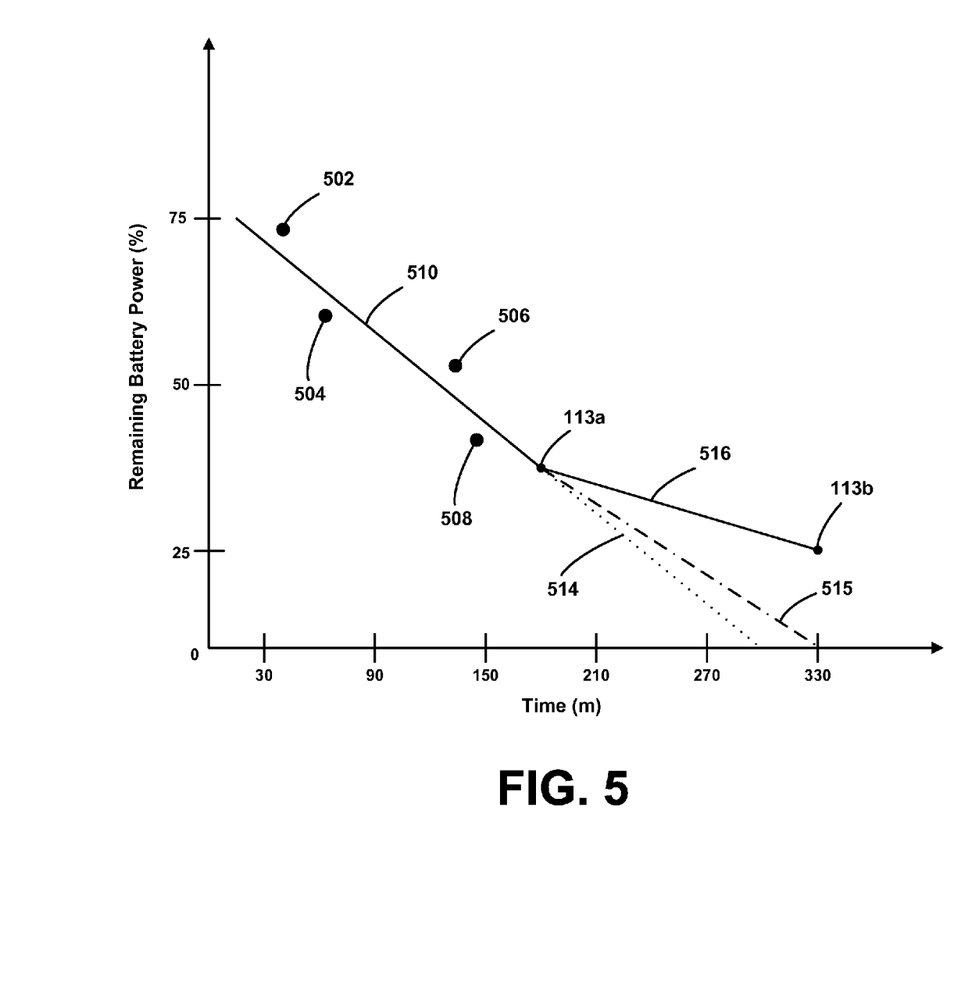
FIG. 5 is a first chart illustrating an example method of calculating an estimated remaining-battery-power level upon arrival at a destination location, and responsively reducing a resource consumption of one or more applications.
Figure 6:
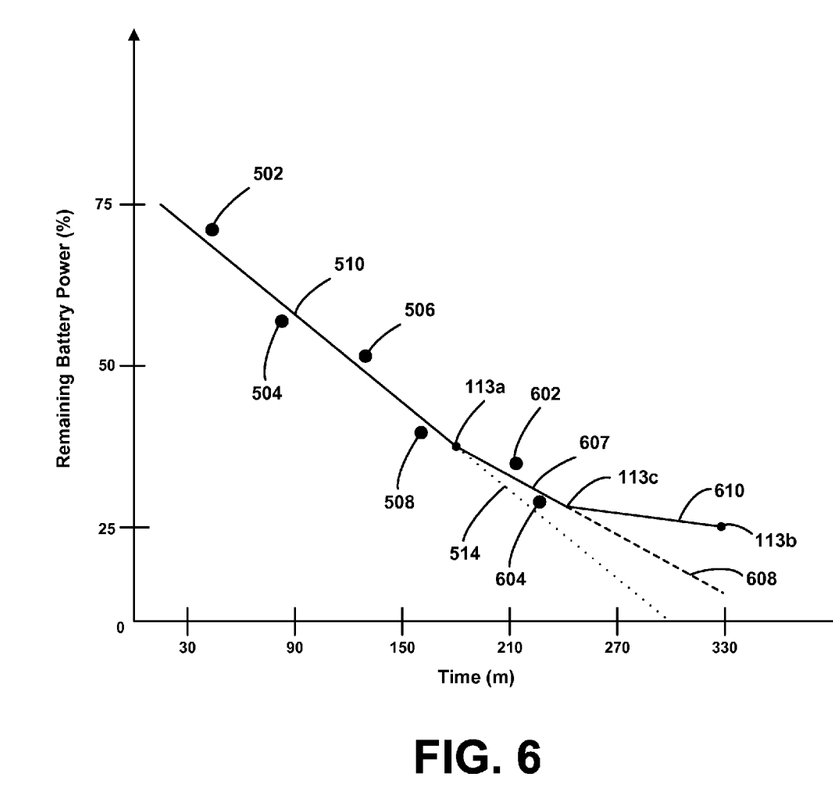
FIG. 6 is a second chart illustrating a subsequent re-calculation of an estimated remaining-battery-power level in the event a first reduction in resource consumption is determined to be insufficient to meet a minimum-threshold level upon arrival at the destination location.

FIGS. 5 and 6 illustrate one example method of this process of estimating a remaining-battery-power level upon arrival at the destination location 113b. For the purposes of this example, it is assumed that the user does not enter the destination location 113b into the mobile station 112 until time t=180 m in FIG. 5. Furthermore, it is assumed that the current location 113a and travel time of FIG. 4 are calculated by a GIS application at time t=180 m (at which time the mobile station 112 is at the current location 113a). Using the calculated estimated travel time of 150 minutes shown in FIG. 4, the estimated time of arrival at the destination location 113b is t=330 m in FIGS. 5 and 6.

As shown in FIG. 5, mobile station 112 begins tracking battery-power level at time t=0 m (e.g., just after initial power-on). For the purposes of illustration, it is assumed that the remaining-battery-power level upon power-on is approximately 75%. After power-on, the resource-allocation logic at mobile station 112 periodically queries the current battery-power level and records the time and battery-power level in program data 214. FIG. 5 illustrates four battery-power data points taken from time t=0 m to time t=150 m that may be recorded in program data 214. The four data points 502, 504, 506, and 508 illustrate (time, battery-power-level) pairs of approximately (40 m, 74%), (60 m, 62%), (130 m, 55%), and (140 m, 40%).

The resource-allocation logic in mobile station 112 may calculate a historical battery-power usage rate in a number of different ways, including a least-squares regression, a quadratic regression, a cubic regression, a power regression, and a sine regression.

For example, in one embodiment, mobile station 112 may estimate a historical batter-power usage rate by first calculating a best-fit line 510 (e.g., a least squares regression line) based on the battery-power-level data points 502-508. In calculating a best-fit line, the linear line equation y=mx+b is calculated, where m is the slope, and b is the intercept, both of which can be calculated according to the equations:

$$m = n\Sigma(x2) - (\Sigma x)2n\Sigma xy - (\Sigma x)(\Sigma y)$$

$$b = n\Sigma y - m(\Sigma x), \text{ where}$$

$\Sigma xy$=sum of products=$x_1 y_1 + x_2 y_2 + \ldots + x_n y_n$
$\Sigma x$=sum of values of x=$x_1 + x_2 + \ldots + x_n$.
$\Sigma y$=sum of values of y=$y_1 + y_2 + \ldots + y$.
$\Sigma x^2$=sum of values of $x^2 = x_1^2 + x_2^2 + \ldots + x_n^2$ The resource-allocation logic may then, based on the calculated best-fit line 510, extrapolate the best-fit line extension 514 into the future to determine how much battery power will be left upon arrival at the destination location 113b, assuming in-transit mobile-station 112 power consumption follows the average-historical-power consumption denoted calculated above. As shown in FIG. 5, and based on data points 502-508, the resource-allocation logic executing in mobile station 112 would estimate, based on the extension 514, that all battery power would be consumed by time t=300 m, well before the predicted time of arrival at destination location 113b.

In the example of FIG. 5, and in view of the calculated best-fit line extension 514, if no action were taken by mobile station 112 to reduce power consumption, it is likely that the mobile station 112 would arrive at the destination 113b without any remaining-battery power in battery 210, and thus without the any power to allow a user to use mobile station's 112 voice and/or data services.

iv. Reducing Allocation of Resources from First Extent to Second Extent

At step 310 in FIG. 3, and in order to prevent such a situation from occurring, the resource-allocation logic at mobile station 112 reduces the allocation of resources for execution of the at least one application from the first extent to a second extent so as to lower the estimated in-transit battery-power consumption rate, and correspondingly raise an estimated remaining-battery-power level upon arrival at the destination location 113b.

Mobile-station resource allocations reduced in this process could comprise, among others, the number of execution cycles per unit of time of processor 204 that are allocated to execution of the e-mail application, the RF-transmit power used in transmitting data to an access point on behalf of the e-mail application, and the data-synchronization frequency of data update requests associated with the e-mail application. Other resource allocations could additionally or alternatively be modified.

For example, to reduce mobile-station 112 resources allocated to the e-mail application, the resource-allocation logic may (i) reduce a data-synchronization frequency associated with the e-mail application from the initial allocation of 1 transmission every 4 minutes to a reduced allocation of 1 transmission every 8 minutes, may (ii) reduce an RF-transmit power used in transmitting data-synchronization requests to the access point (e.g., BTS 109) from the initial allocation of 0.85 Watts to a reduced allocation of 0.7 Watts (which may, of course, result in an increase in the frame-error rate above the 1% initially requested by the e-mail application), and/or may (iii) reduce the number of processor execution cycles per unit of time of processor 204 allocated to the e-mail application from the initial allocation of $3 \times 10^7$ execution cycles per second (approximately 1% of the available execution cycles on a 3 GHz processor) to a reduced allocation of $1.5 \times 10^7$ execution cycles per second (approximately 0.5% of the available execution cycles on a 3 GHz processor).

Resource-allocation logic running on mobile station 112 may determine what level of reduction to use for these allocations based on past knowledge of similar reductions' effects on battery-power consumption, or based on some internal algorithm (perhaps developed on a mobile-station model-by-model basis) that associates a particular allocation reduction level with an associated estimated decrease in battery-power consumption. For example, mobile station 112 may determine that a decrease in RF-transmit power from 0.85 Watts to 0.7 Watts will reduce power consumption by approximately 5%. Similar associations may be developed or programmed for processor execution cycles and data-synchronization frequencies. Additionally, although only one application (e-mail) is discussed in this example, mobile station 112 may apply similar resource-allocation reductions to other applications running on the mobile station 112 at a same, or different, times and using same, or different reduction levels.

In one example, resource-allocation logic at mobile station 112 may base the level of reduction in resource allocation noted above on a predicted new power consumption slope 515 necessary to cause the mobile station's 112 battery 210 to last at least until the destination 113b is reached at time t=330 m.

In at least one embodiment, the resource-allocation logic may further take into consideration the minimum-threshold value stored in program data 214 in determining what level of reduction in resource allocations needs to be made. For example, a minimum-battery-power-level-threshold value of 25% stored in program logic 214 may be used by the resource-allocation logic in determining what level of reduction is necessary. Based on the minimum-threshold-power level of 25%, the resource-allocation logic may calculate a different power-consumption slope 516 necessary to cause the mobile station's battery 210 to retain 25% of its charge upon arrival at the destination location 113b. In order to obtain such a reduction in in-transit battery-power consumption in this example, the resource-allocation logic may further reduce mobile-station resources allocated to the e-mail application.

For example, mobile station 112 may further reduce (i) the data-synchronization frequency associated with the e-mail application to a further-reduced allocation of 1 transmission every 16 minutes, (ii) the RF-transmit power used in transmitting data to the access point to a further-reduced allocation of 0.6 Watts (which may, of course, result in a further increase in the frame-error rate above the 1% initially requested by the e-mail application), and/or (iii) the number of processor execution cycles per unit of time of processor 204 allocated to the e-mail application to a further-reduced allocation of $0.75 \times 10^7$ execution cycles per second (approximately 0.25% of the available execution cycles on a 3 GHz processor).

Although estimating in-transit battery consumption rates based on historical usage rates may give a good estimate of in-transit rates, actual mobile station 112 usage (e.g., resource allocation and battery consumption) during the time period after t=180 m may vary from historical norms. Accordingly, and as shown by the dotted line 312 in FIG. 3, method steps 306-310 may be repeated one or more times (or at a particular interval) between time t=180 m and time t=330 m to ensure that the estimated in-transit power-consumption rate (shown in respective lines 515 and 516 in FIG. 5) is actually maintained as time progresses and as the mobile station 112 approaches the destination location 113b.

FIG. 6 illustrates one example of this repeated process step 312. It is assumed for the purposes of the example in FIG. 6 that mobile station 112 executed a first re-calculation process at time t=180 m (taking into consideration a minimum-battery-power-level threshold of 25%), which resulted in a first decreased allocation of resources (similar to that illustrated in FIG. 5). After time t=180 m, and as illustrated in FIG. 6, the resource-allocation logic continues to track battery-power level usage via data points 602 and 604. For example, data points 602 and 604 illustrate (time, battery-power-level) pairs of approximately (215 m, 35%) and (230 m, 30%). At time t=245 m, the resource-allocation logic at mobile station 112 recalculates a new best-fit line 607 using the new data points 602 and 604. Although in this example prior data points 502-508 are not considered, in another embodiment, they may be considered.

In calculating the new best-fit line 607, the resource-allocation logic may use the same, or different, algorithm used in calculating the previous line 510. By extrapolating the best-fit line 607 into the future via extension 608, the resource-allocation logic may determine that the first allocation reduction was insufficient as the predicted remaining-battery-power level upon arrival at destination location 113b at time t=330 m is below the minimum-threshold level of 25%.

Responsive to this determined insufficiency, the resource-allocation logic may calculate a second new line 610 necessary to meet the minimum-power-level threshold of 25% upon arrival at the destination location 113b, and accordingly further reduce the allocation of resources to applications executing on the mobile station 112, such as the e-mail application, at time t=245 m (and taking into account new current location 113c). Further monitoring and further allocation reductions may be made between time t=245 m and time t=330 m.

Any further monitoring and further allocation reductions (e.g., step 312) may be halted once the resource-allocation logic determines that mobile station 112 has reached the destination location 113b. The resource-allocation logic may make this determination in conjunction with the GIS application. For example, the resource-allocation logic may query the GIS application (locally or via the wireless-service-provider core network 102), which when queried, may return an estimated distance to the destination location 113b and/or an estimated time to arrive at the destination location 113b. If the returned destination and/or time is below an "arrival" threshold value, resource-allocation logic may determined that mobile station 112 has arrived, and halt any further monitoring and resource-allocation reductions. The arrival threshold value may be set at, for example, 1 mile and/or 5 minutes. In one embodiment, the arrival threshold value may be increased in order to avoid a situation where the mobile station 112 continuously reduces allocated resources despite the fact that the mobile station 112 user has already effectively "arrived" at the destination location 113b, which for whatever reason, may not exactly correspond to a destination location 113b indication retrieved by the GIS application. In one example, mobile station 112 may consider anywhere within an approximate 2-mile radius of the destination location 113b as being arrived for the purpose of halting further resource-allocation reductions.

The resource-allocation logic's determination of an arrived status may be made separate from any monitoring and allocation reduction functions, or may be integrated with the monitoring and allocation reduction functions. For example, in the process of monitoring and potentially further reducing mobile-station resource allocations, if the GIS application returns an estimated distance and/or time that is below the arrival threshold, the resource-allocation logic may use this information to determine that the mobile station 112 has arrived at the destination location 113b without separately querying the GIS application.

Such allocation re-calculations illustrated in step 312 of FIG. 3 may also become necessary in the event of delays in an estimated-time-of-arrival at the destination location 113b, perhaps as a result of unexpected traffic or an unexpected number of pit-stops. The additional monitoring and re-calculation illustrated in step 312 of FIG. 3 can compensate for an extension in estimated arrival time (such as extending the arrival time from t=330 m to time t=360 m) by similarly further reducing allocations of mobile-station resources to one or more applications in one or more or the ways noted above.

In at least one embodiment, if the resource-allocation logic at mobile station 112 determines that the estimated travel time to arrive at the destination location is too long, and would require a substantial reduction in resource allocation (e.g., 1-25% of a current allocation, which may render the applications unusable), mobile station 112 may provide an indication (perhaps via a display part of the user interface 200) advising a user that mobile station 112 should be powered down for a period of time to ensure that battery power remains upon arrival at the destination location 113b. If the user heeds the advice and powers the mobile station 112 down, upon powering-up again, the mobile station 112 could update its current location 113a, and re-determine an estimated battery-power level upon arrival at the destination location 113b, perhaps using historical battery-power consumption data stored before powering down.

In at least one embodiment, new applications that are started after the destination location 113b is already entered may be provided with an already-reduced initial allocation of mobile-station resources, based on at least the estimated remaining power of the battery and the estimated current travel time for the mobile station 112 to reach the destination location 113b. For example, if prior to the new application starting, the resource-allocation logic at mobile station 112 has already reduced resources allocated to other already-running applications by 50%, the initial allocation of mobile-station resources granted to the new application (relative to the level requested) may be similarly reduced by 50% by the resource-allocation logic. Further reductions to the initial allocation may be implemented in any manner set forth above.

d. Conclusion

In light of the foregoing embodiments, a user of mobile station can more often avoid a situation where no battery power remains upon arrival at a destination location, and thus where no voice and/or data services via mobile station are available to the user upon arrival at the destination location.

While exemplary embodiments have been described, persons of skill in the art will appreciate that variations may be made without departure from the scope and spirit of the invention. This true scope and spirit is defined by the appended claims, which may be interpreted in light of the foregoing.

What is claimed is:

1. In a mobile station having mobile-station resources and having a battery that provides power to the mobile-station resources for executing applications, the mobile station being located at a current location and heading to a destination location, a method comprising:
 based on at least a comparison of the current location and the destination location, the mobile station estimating a current travel time for the mobile station to reach the destination location;
 based on at least the estimated travel time, the mobile station estimating what a remaining power of the battery will be when the mobile station arrives at the destination location; and
 based on at least the estimate of what the remaining power of the battery will be when the mobile station arrives at the destination location, the mobile station allocating a first extent of resources for execution of at least one application.

2. The method of claim 1, further comprising, based on at least the estimate of what the remaining power of the battery will be when the mobile station arrives at the destination location, the mobile station reducing the allocation of resources for execution of the at least one application from the first extent to a second extent.

3. The method of claim 2, wherein reducing the allocation of resources comprises reducing a number of execution cycles per unit of time of a processor that are dedicated to execution of the application.

4. The method of claim 2, wherein reducing the allocation of resources comprises reducing a radio-frequency (RF) power used in transmitting data to an access point on behalf of the application.

5. The method of claim 1, further comprising the mobile station determining the current location by carrying out at least one function selected from the group consisting of: requesting information indicative of the current location from a global positioning system (GPS) receiver disposed within the mobile station, determining the current location by triangulation with three or more wireless access points, and receiving information indicative of the current location directly from a wireless access point.

6. The method of claim 1, wherein estimating a current-travel time comprises providing the current location and the destination location to a navigation application having access to digital map information, and in response, receiving the current-travel time from the navigation application.

7. The method of claim 6, wherein the navigation application is executed by a local processor.

8. The method of claim 6, wherein the navigation application is executed at a network device external to the mobile station, and providing the current location and the destination location comprises transmitting the current location and the destination location to the network device via a wireless access point.

9. The method of claim 1, further comprising selecting the first extent so as to provide a minimum-threshold level of remaining-battery power upon arrival at the destination location.

10. The method of claim 9, wherein the minimum-threshold is in the range of 1-25% of estimated-remaining power.

11. The method of claim 1, further comprising the mobile station receiving a user-selected indication of the destination location via an input interface.

12. The method of claim 1, further comprising:
based on at least the first extent of the resources allocated to the at least one application, the mobile station reducing the allocation of resources for execution of a second application from a second extent to a third extent.

13. A mobile station comprising:
a battery that provides power to mobile-station resources for executing applications;
a communication interface;
a processor; and
data storage containing instructions executable by the processor for causing the mobile station to carry out a set of functions including:
based on at least a comparison of a current location of the mobile station and a destination location of the mobile station, estimating a current travel time for the mobile station to reach the destination location,
based on at least the estimated travel time, estimating what a remaining power of the battery will be when the mobile station arrives at the destination location; and
based on at least the estimate of what the remaining power of the battery will be when the mobile station arrives at the destination location, the mobile station allocating a first extent of resources for execution of at least one application.

14. The mobile station of claim 13, wherein the set of functions further comprise, based on at least the estimate of what the remaining power of the battery will be when the mobile station arrives at the destination location, reducing the allocation of resources for execution of the at least one application from the first extent to a second extent.

15. The mobile station of claim 14, wherein reducing the allocation of resources comprises reducing a number of execution cycles per unit of time of the processor that are dedicated to execution of the application.

16. The mobile station of claim 14, wherein reducing the allocation of resources comprises reducing a radio-frequency (RF) power of the communication interface used in transmitting data to an access point on behalf of the application.

17. The mobile station of claim 13, wherein the set of functions further comprises the mobile station determining the current location by carrying out at least one function selected from the group consisting of: requesting information indicative of the current location from a global positioning system (GPS) receiver disposed within the mobile station, determining the current location by triangulation with three or more access points, and receiving information indicative of the current location directly from an access point.

18. The mobile station of claim 13, wherein estimating a current-travel time comprises providing the current location and the destination location to a navigation application having access to digital map information, and in response, receiving the current-travel time from the navigation application.

19. The mobile station of claim 13, the set of functions further comprising selecting the first extent so as to provide a minimum-threshold level of remaining-battery power upon arrival at the destination location.

20. The mobile station of claim 19, wherein the minimum-threshold is in the range of 1-25% of estimated-remaining power.

21. The mobile station of claim 13, further comprising an input interface, wherein the set of functions further comprise receiving a user-selected indication of the destination location via the input interface.

22. In a mobile station having mobile station resources and having a battery that provides power to the mobile-station resources for executing applications, the mobile station being located at a current location and heading to a destination location, a method comprising:
the mobile station allocating a first extent of the resources for execution of at least one application by the mobile station;
the mobile station receiving an indication of the destination location via an input interface;
the mobile station determining the current location by at least one function selected from the group consisting of: requesting information indicative of the current location from a global positioning system (GPS) receiver disposed within the mobile station, determining the current location by triangulation with three or more access points, and receiving information indicative of the current location directly from an access point,
the mobile station providing the current location and the destination location to a navigation application having access to digital map information, and in response, receiving a current-travel time from the navigation application,
based on at least the received travel time, the mobile station estimating what a remaining power of the battery will be when the mobile station arrives at the destination location; and
based on at least the estimate of what the remaining power of the battery will be when the mobile station arrives at the destination location and on a predetermined minimum-threshold level of remaining power of the battery upon arrival at the destination, the mobile station reducing the allocation of resources for execution of the at least one application from the first extent to a second extent.

* * * * *